United States Patent
Skirke et al.

(10) Patent No.: US 12,202,031 B2
(45) Date of Patent: Jan. 21, 2025

(54) METHOD FOR REMOVING A TWO-PART CONNECTOR IN A WORKPIECE ARRANGEMENT

(71) Applicant: Airbus Operations GmbH, Hamburg (DE)

(72) Inventors: Jörn Skirke, Hamburg (DE); Alexander Schäfer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 57 days.

(21) Appl. No.: 17/555,982

(22) Filed: Dec. 20, 2021

(65) Prior Publication Data

US 2022/0176440 A1     Jun. 9, 2022

Related U.S. Application Data

(63) Continuation of application No. PCT/EP2020/067166, filed on Jun. 19, 2020.

(30) Foreign Application Priority Data

Jun. 21, 2019 (DE) .................... 10 2019 116 780.9

(51) Int. Cl.
*B21J 15/50*     (2006.01)
(52) U.S. Cl.
CPC .................... *B21J 15/50* (2013.01)
(58) Field of Classification Search
CPC ...................................................... B21J 15/50
See application file for complete search history.

(56) References Cited

U.S. PATENT DOCUMENTS 806,493 A * 12/1905 Plummer ............. B23D 15/145
                                                                        30/182
2,688,185 A     9/1954 Brazil et al.
(Continued)

FOREIGN PATENT DOCUMENTS

DE           297 19 680 U1     3/1999
DE        102009053162 A1 * 5/2011 .............. B21J 15/50
(Continued)

OTHER PUBLICATIONS

Machine translation of DE-29719680-U1 (Year: 1999).*
(Continued)

*Primary Examiner* — Kyle A Cook
(74) *Attorney, Agent, or Firm* — KDW Firm PLLC

(57) ABSTRACT

A method for removing a two-part connector in a workpiece arrangement includes providing a workpiece arrangement having first and second surfaces and having a hole connecting the first surface to the second surface. A connector is fastened in the hole, which connector has a bolt extending along a central axis and a sleeve fastened on the bolt. The bolt has a head portion and a shank portion with retaining grooves. The sleeve is fastened to the bolt on the side of the second surface such that the inner surface thereof engages with the retaining grooves and prevents a relative movement of bolt and sleeve parallel to the central axis. The sleeve has an outside diameter which is greater than the diameter of the hole in the workpiece arrangement. The sleeve is cut and or the bolt, and the connector is removed from the hole.

8 Claims, 5 Drawing Sheets

(56) References Cited

U.S. PATENT DOCUMENTS

| | | | | | |
|---|---|---|---|---|---|
| 2,716,812 | A | * | 9/1955 | Noonan | B21J 15/50 30/180 |
| 3,182,396 | A | * | 5/1965 | Konzak | B21J 15/50 30/344 |
| 3,535,782 | A | * | 10/1970 | Peltoniemi | E01B 29/28 D8/47 |
| 4,069,582 | A | * | 1/1978 | Kearns | B26B 17/02 30/182 |
| 4,637,112 | A | * | 1/1987 | Asari | B21K 1/28 148/688 |
| 2012/0180287 | A1 | * | 7/2012 | Rudgley | B25B 31/00 29/426.4 |
| 2013/0004263 | A1 | * | 1/2013 | Palmisano | B21J 15/50 411/501 |
| 2017/0100824 | A1 | * | 4/2017 | Sajdak | B21J 15/145 |
| 2019/0047063 | A1 | * | 2/2019 | Alby | B26B 17/003 |

FOREIGN PATENT DOCUMENTS

| | | | |
|---|---|---|---|
| DE | 20 2013 008 530 U1 | 11/2013 | |
| GB | 2 564 414 A | 7/2017 | |
| KR | 101013397 B1 * | 2/2011 | ............. B21J 15/50 |
| WO | WO 2019/008146 A1 | 1/2019 | |
| WO | 2020229488 A1 | 11/2020 | |

OTHER PUBLICATIONS

Cruzdelasada technical, Three ways to remove the rivets, YouTube, Published Mar. 21, 2016, available at https://www.youtube.com/watch?v=uG5plvly3wk (Year: 2016).*

Paul Hasenmeier, Air Chisel on ¼" bolts, YouTube, published on Jun. 29, 2012, available at https://www.youtube.com/watch?v=DDznaW1epaM (Year: 2012).*

Wikihow, How to remove rivets, screen shot taken on Feb. 20, 2019, available at https://www.wikihow.com/Remove-Rivets (Year: 2019).*

Machine translation of KR-101013397-B1 (Year: 2011).*

Machine translation of DE-102009053162-A1 (Year: 2011).*

German Search Report for Application No. 102019116780 dated May 28, 2020.

International Search Report and Written Opinion for Application No. PCT/EP2020/067166 dated Sep. 7, 2020.

European Office Action for Application No. 20734353 dated Nov. 29, 2023.

* cited by examiner

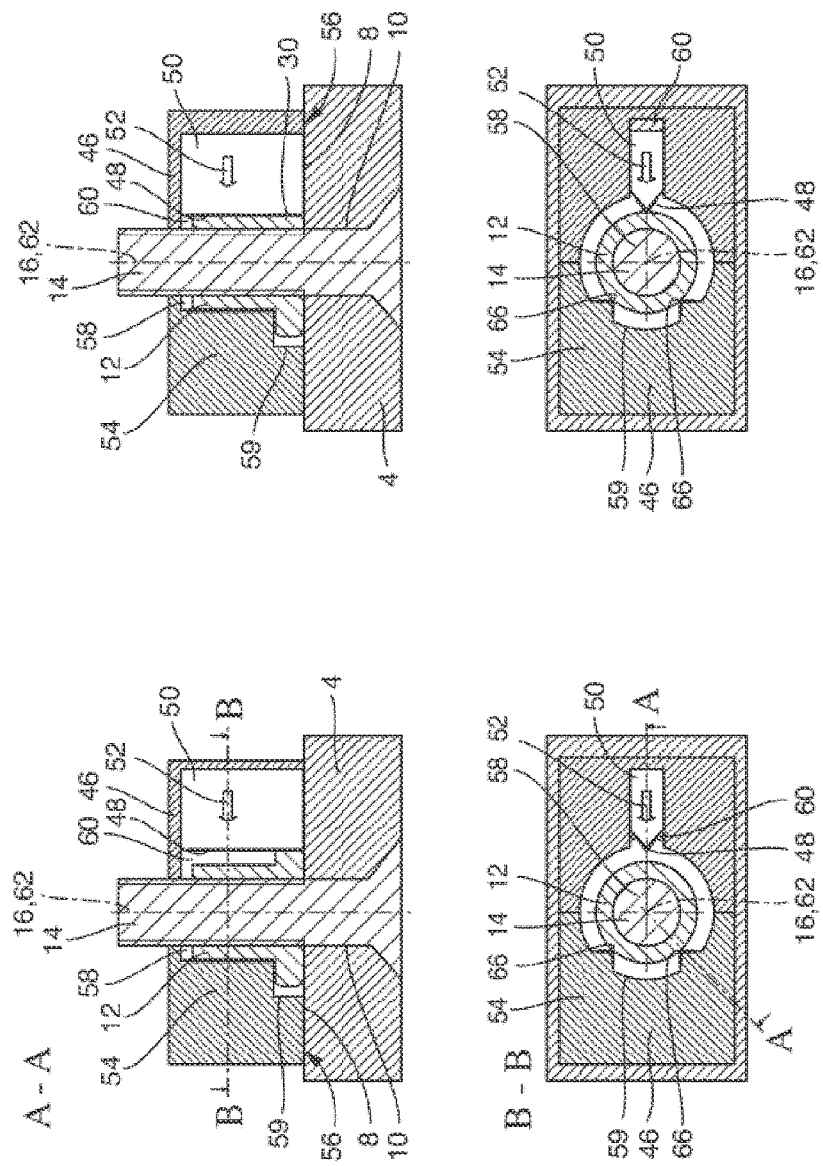

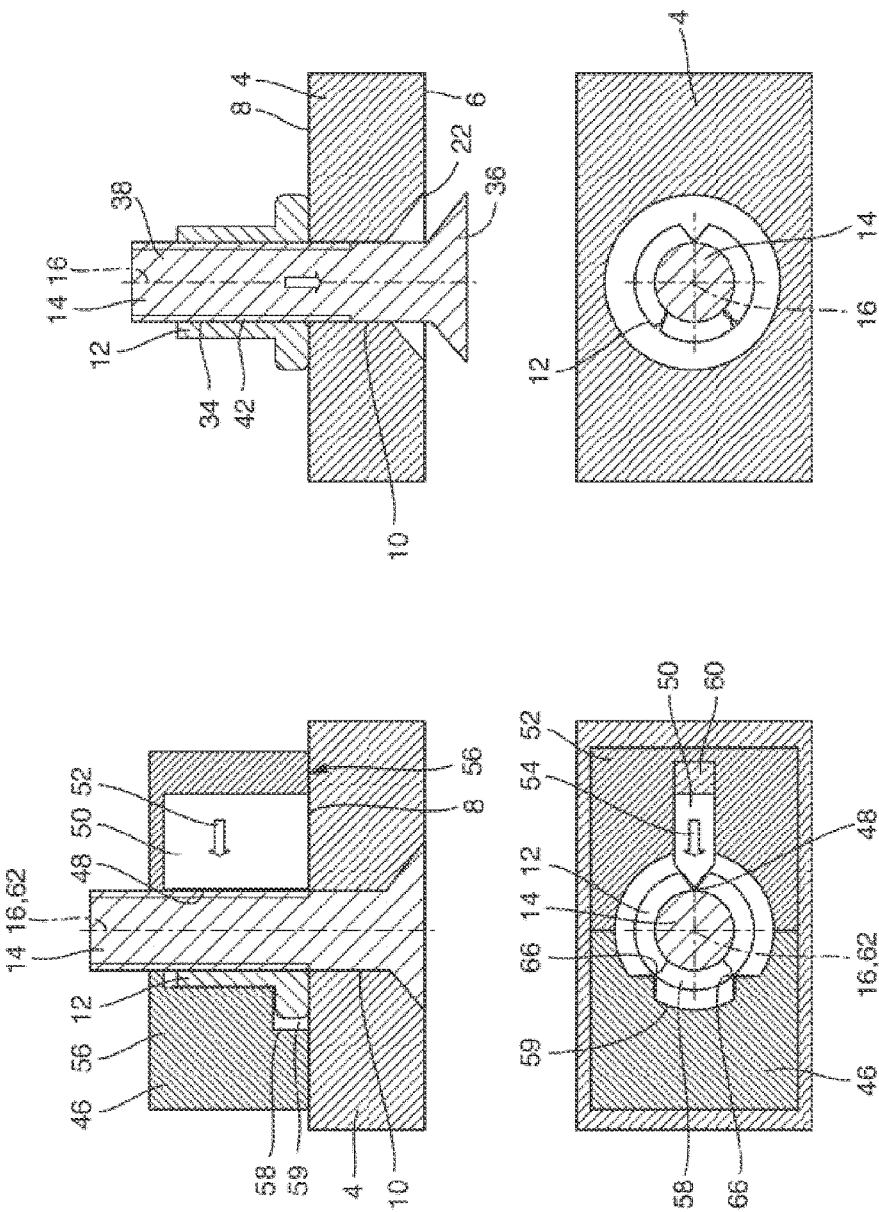

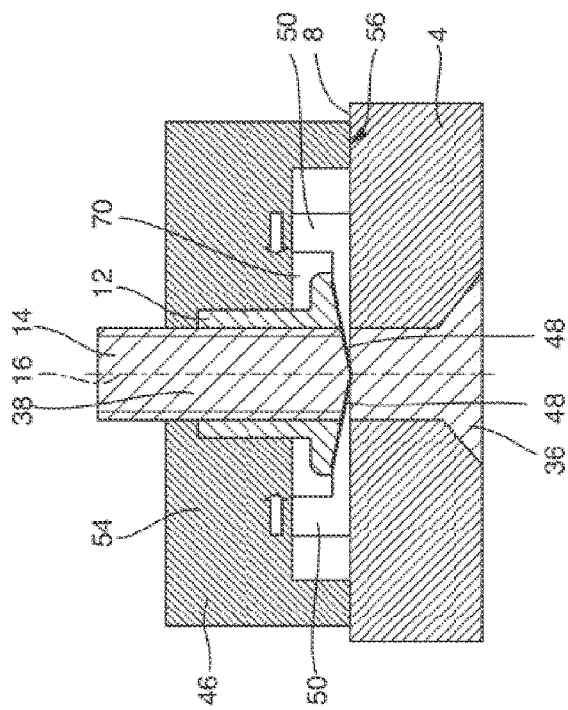
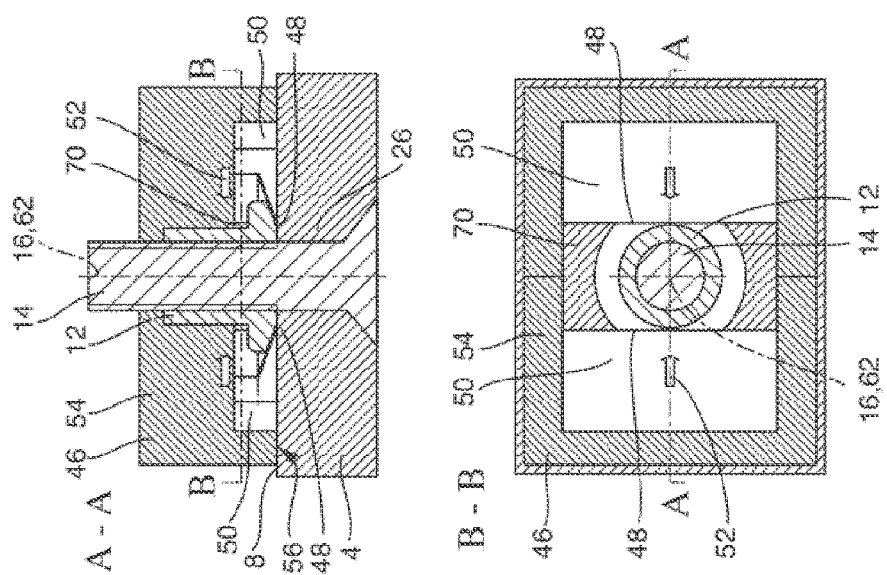

METHOD FOR REMOVING A TWO-PART CONNECTOR IN A WORKPIECE ARRANGEMENT

CROSS-REFERENCE TO RELATED APPLICATIONS

This application is a continuation of and claims priority to Patent Application No. PCT/EP2020/067166 filed Jun. 19, 2020, which claims priority to German Patent Application No. 10 2019 116 780.9 filed Jun. 21, 2019, the entire disclosures of which are incorporated by reference herein.

TECHNICAL FIELD

The disclosure herein relates to a method for removing a two-part connector, in particular a pin fastener, for example a screw pin fastener ("Hi-Lok" or "Hi-Lite") or a lockbolt, in a workpiece arrangement.

BACKGROUND

Various improved two-part connectors, for example lockbolts or screw pin fasteners, are increasingly being used in particular in aircraft construction in order to allow increased automation in the manufacturing process. This is attributable primarily to the fact that these can be attached in an automated manner, for example by robots, to the workpiece arrangement to be connected. However, for the removal of such connectors, which is frequently necessary for example for maintenance purposes, it has hitherto been necessary to drill out the connector, this being complicated, time-consuming and usually not possible without damaging the workpiece.

SUMMARY

Therefore, it is an object of the disclosure herein to provide a simple and quick method, which is as non-damaging as possible, for removing a two-part connector in a workpiece arrangement.

This object is achieved by a method having the following steps:

First of all, a workpiece arrangement is provided, in which a two-part connector is located. The workpiece arrangement comprises a single workpiece or a plurality of workpieces to be connected that rest against one another, preferably aircraft structural components, for example skin elements of the fuselage or wing. The workpiece arrangement has a first surface and an opposite second surface, and a hole, in particular a drilled hole or a bore, which connects the first surface to the second surface.

Arranged in the hole is a connector, which has a bolt and a sleeve fastened coaxially to the bolt. Both the sleeve and the bolt preferably have a circular cross section. The bolt is preferably made from a stronger material than the sleeve. For example, the bolt can be made of titanium and the sleeve from steel. The bolt extends along a centerline between a first end on the side of the first surface and a second end on the side of the second surface of the workpiece arrangement.

The bolt has, as seen along the centerline from the first end to the second end, first of all a head portion with a diameter that is greater than the diameter of the hole. Adjoining the latter, the bolt has a shank portion, the diameter of which, as seen along the centerline, is preferably constant and less than or equal to the diameter of the hole. As seen along the centerline, at least that part of the shank portion that projects out of the workpiece arrangement on the side of the second surface, preferably the part that has the second end, has retaining grooves that extend at least predominantly in the circumferential direction. Such retaining grooves may be, for example, as in the case of lockbolts, annular grooves that extend in the circumferential direction and are spaced apart from one another in the axial direction, or may, as in the case of screw pin fasteners, be an external thread.

The sleeve is fastened to the bolt on the side of the second surface such that its inner surface engages with the retaining grooves and prevents relative movement of the bolt and sleeve parallel to the centerline. The sleeve furthermore has, at least partially, an outside diameter that is greater than the diameter of the hole in the workpiece arrangement, such that the sleeve forms a counter bearing on the side of the second surface, or on the side of the second end.

To remove the connector, the sleeve or the bolt is now cut, or both the sleeve and the bolt are cut. Subsequently, the connector is removed from the hole, wherein the cut sleeve can be for example stripped off.

Thus, the connector can be removed quickly, easily and safely without complicated drilling out of the connector, damaging the workpiece arrangement, being necessary.

According to a preferred embodiment, the sleeve is cut with at least one cut parallel to the centerline. As a result, the sleeve splits open along the cut, and so the diameter is increased and the sleeve disengages from the retaining grooves of the bolt.

It is particularly preferred here when the cut extends at least along the retaining grooves. In this way, the engagement of the inner surface of the sleeve with the retaining grooves can be released.

In a preferred embodiment, the sleeve is cut using a cutting tool which has a blade with a straight cutting edge which is moved against the sleeve, in a manner oriented parallel to the centerline, in a radial direction toward the centerline, until the sleeve has been cut, i.e. separated, along the cutting edge. In this way, the sleeve can be cut with a single movement of the blade.

It is particularly preferred here when the cutting tool has a supporting body with a contact face for bearing on the second surface of the workpiece arrangement, and a bore that proceeds from the contact face and is adapted to the external shape of the sleeve, and having a guide slot that extends radially outwardly from the bore. The blade is arranged in the guide slot so as to be movably guided such that the cutting edge extends preferably parallel to the central axis of the bore and can be moved into the bore and preferably toward the central axis. This represents a particularly simple and effective design of the cutting tool.

To cut the sleeve, the cutting tool is arranged such that the contact face bears on the second surface of the workpiece arrangement and the connector projecting out of the hole at the second surface extends into or through the bore, such that the central axis of the bore extends coaxially with the centerline of the bolt. Then, the blade is moved in the guide slot toward the sleeve in the direction of the centerline until the cutting edge cuts the sleeve, in particular the region of the retaining grooves. In this way, the sleeve can be cut very easily and reliably.

It is also particularly preferred when one or more further cutting edges which extend parallel to the central axis and on which the sleeve bears when the latter is located in the bore are provided on the inner wall of the bore in a manner spaced apart, preferably uniformly spaced apart, from the guide slot in the circumferential direction, such that, as a result of the pressure exerted on the sleeve by the cutting edge of the blade, the sleeve is also cut by the other cutting edges. As a result, the sleeve is cut from several sides and the engagement with the retaining grooves can be released more easily and more quickly.

In a preferred embodiment, after the sleeve has been cut, the bolt is removed in the direction toward the side of the first surface. This is possible since, as a result of the sleeve being cut, the inner surface of the sleeve is no longer or no longer fully engaged with the retaining grooves of the bolt, such that the bolt can be released from the sleeve.

Preferably, the bolt is removed by the second end of the bolt being struck, preferably in the axial direction. This is appropriate in particular when there is still slight residual engagement with the retaining grooves. The bolt is thus then also struck out of the sleeve.

According to an alternative embodiment of the method according to the disclosure herein, the bolt is cut with at least one cut transversely, in particular perpendicularly to the centerline, i.e. in the circumferential direction. In this way, the detached part of the bolt can no longer form a counter bearing with the sleeve fastened thereto and the remaining part of the bolt can be removed from the hole.

It is preferred here when the bolt is cut between the sleeve and the second surface in the continuation of the second surface of the workpiece arrangement. This is particularly easy since the cutting tool can be moved along the second surface and the sleeve remains entirely on the detached part of the bolt.

It is also preferred when a plurality of cuts are made from different sides of the sleeve during the cutting of the bolt, for example two cuts from opposite sides of the sleeve. In this way, the bolt can be cut uniformly and quickly from a plurality of sides.

In a preferred embodiment, the bolt is cut using a cutting tool which has a blade with a cutting edge which is moved against the bolt, in a manner oriented perpendicularly to the centerline, in a radial direction toward the centerline, until the bolt has been cut, i.e. severed, along the cutting edge. In this way, the bolt can be cut very easily.

In a further preferred embodiment, the cutting tool has two blades with opposite cutting edges which, to cut the bolt, are moved toward the bolt from opposite, in particular opposing sides. The two cutting edges preferably have in this case an identical radius of curvature, and are either straight or concavely curved.

It is particularly preferred here when the cutting tool has a supporting body, preferably in the form of a frame, with a contact face for bearing on the second surface of the workpiece arrangement, and an opening that extends proceeding from the contact face perpendicularly along a central axis, into which opening that part of the connector that projects out of the hole at the second surface, in particular the shank portion with the retaining grooves and the sleeve, can extend and which opening is adapted to the external shape of the sleeve and preferably also of the shank portion of the bolt. The two blades with opposite cutting edges are arranged in the opening so as to be movably guided such that the cutting edges extend preferably perpendicularly to the central axis and can be moved in a radial direction toward the central axis from opposite sides. This represents a particularly simple and effective design of a cutting tool.

It is also particularly preferred when, to cut the bolt, the cutting tool is arranged on the workpiece arrangement such that the contact face bears on the second surface and the connector extends into or through the opening such that the centerline extends coaxially with the central axis, after which the blades are moved preferably simultaneously along the second surface toward the bolt from opposite sides and cut the latter in the continuation of the second surface. In this way, the bolt can be cut particularly easily.

BRIEF DESCRIPTION OF THE DRAWINGS

Preferred example embodiments of the disclosure herein are explained in more detail in the following text with reference to a drawing, in which:

FIGS. 3A, 3B and 3C show three sequential cross-sectional views parallel and perpendicular to the centerline of the connector shown in FIG. 1 while the sleeve is being cut with a cut parallel to the centerline according to a first embodiment of the method according to the disclosure herein;

FIG. 4 shows a cross-sectional view parallel and perpendicular to the centerline of the connector shown in FIG. 1, while the bolt is being removed from the sleeve according to the first embodiment of the method according to the disclosure herein; and FIGS. 5A and 5B show two sequential cross-sectional views parallel and perpendicular to the centerline of the connector shown in FIG. 1, while the bolt is being cut with a cut perpendicular to the centerline according to a second embodiment of the method according to the disclosure herein.

DETAILED DESCRIPTION

Figure 1:
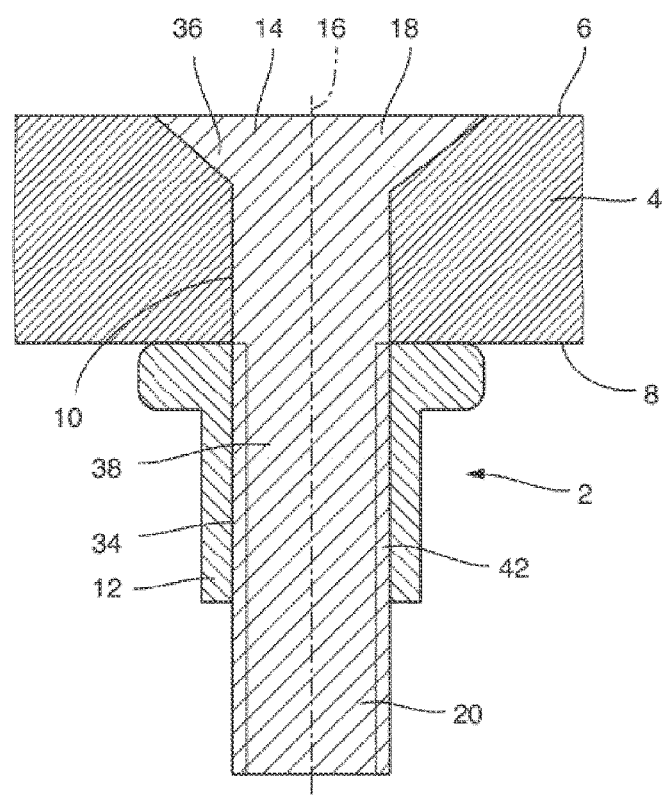
FIG. 1 shows a cross-sectional view parallel to the centerline of an example of a connector in a workpiece arrangement, the connector being able to be removed using a method according to the disclosure herein.

FIG. 1 illustrates an example embodiment of a two-part connector 2, in the present case a screw pin fastener, which has been fitted in a workpiece arrangement 4, from which the connector 2 can be removed in a particularly simple, quick and largely non-damaging manner according to the embodiments of the method according to the disclosure herein that are described below.

The workpiece arrangement 4 has a first surface 6 and an opposite second surface 8, and a hole 10 which connects the first surface 6 to the second surface 8. Fastened in the hole 10 is the connector 2, which has a bolt 14 and a sleeve 12 attached coaxially around the bolt. Both the sleeve 12 and the bolt 14 have a circular cross section. The bolt 14 is made of titanium and the sleeve 12 is made of steel. The bolt 14 extends along a centerline 16 between a first end 18 on the side of the first surface 6 and a second end 20 on the side of the second surface 8 of the workpiece arrangement 4.

As seen along the centerline 16 from the first end 18 to the second end 20, the bolt 14 first of all has a head portion 36 with a diameter that is greater than the diameter of the hole 10. Adjoining this, the bolt 14 has a shank portion 38, the diameter of which, as seen along the centerline 16, is constant and less than or equal to the diameter of the hole 10. As seen along the centerline 16, that part of the shank portion 38 that projects out of the workpiece arrangement on the side of the second surface 8 and has the second end 18 has retaining grooves 42 that extend at least predominantly in the circumferential direction.

The sleeve 12 is fastened to the bolt 14 on the side of the second surface 8 such that its inner surface 74 engages with the retaining grooves 42 and prevents relative movement of the bolt 14 and sleeve 12 parallel to the centerline 16. The sleeve 12 also has an outside diameter which is greater than the diameter of the hole 10 in the workpiece arrangement 4, such that the sleeve forms a counter bearing on the side of the second surface 8. In the embodiment in FIG. 1, in which the connector is embodied as a screw pin fastener, the bolt is in the form of a screw, the retaining grooves are in the form of an external thread and the sleeve is in the form of a nut with an internal thread 34 engaging with the external thread. To fasten the screw pin fastener in the hole 10, first of all the bolt 14 is introduced into the hole 10 and then the sleeve 12 is screwed onto the external thread of the bolt 14 at the second end 18. Subsequently, the sleeve 12 is prevented from rearwardly unscrewing by self-securing of the nut, in particular in the form of crimping, and thus forms a counter bearing on the side of the second surface 8.

Figure 2A:
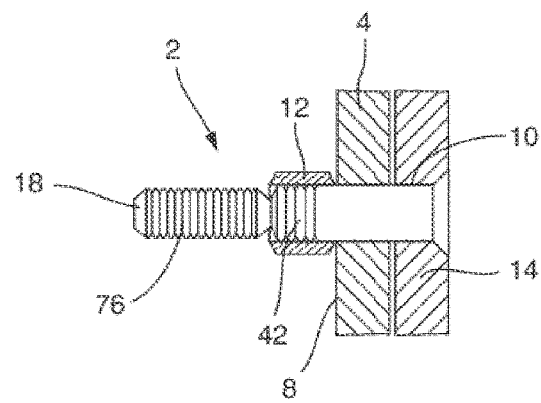
FIGS. 2A, 2B, 2C and 2D show four sequential cross-sectional views parallel to the centerline of a second example of a connector while it is being fastened in a workpiece arrangement.
Figure 2B:
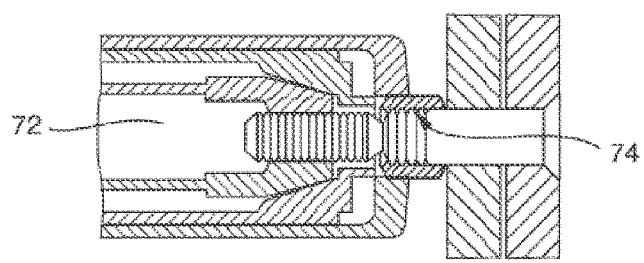
Figure 2C:
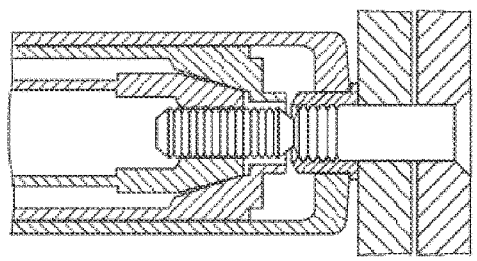
Figure 2D:
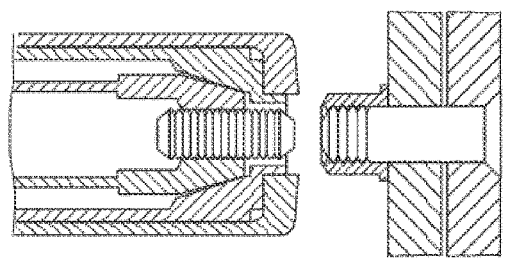

As an alternative to the screw pin fastener, the connector 2 can also be embodied as a lockbolt. FIGS. 2A-2D show such an example embodiment of a connector 2 in the form of a lockbolt and how it is fastened in a workpiece arrangement 4. In this case, the sleeve 12 is then in the form of a locking collar and the retaining grooves 42 are in the form of annular grooves that extend in the circumferential direction and are spaced apart from one another in the axial direction. However, the retaining grooves 42 can, in other embodiments, also be embodied as a thread rather than as annular grooves in the case of the connector 2 embodied as a lockbolt. As illustrated in FIG. 2A, first of all the bolt 14 is introduced into the hole 10 and the sleeve 12 is pushed over the bolt 14 from the second end 18 until it bears on the second surface 8 and covers the retaining grooves 42. Subsequently, the sleeve 12 is pressed into the retaining grooves 42 with the aid of an appropriate tool 72, wherein the sleeve 12 is plastically deformed such that the inner surface 74 of the sleeve 12 engages in the retaining grooves 42 and thus fixes the sleeve 12 in the axial direction with respect to the bolt 14, as shown in FIG. 2B and FIG. 2C. Finally, the tool 72 is removed, wherein the extension 76 on the second end of the bolt 14, which extension is used for supporting the tool 72 and is now no longer required, is removed together with the tool 72, in particular is snapped off, see FIG. 2D.

To remove the connector 2, which is explained by way of example using the screw pin fastener from FIG. 1, the two embodiments, described below, of the method according to the disclosure herein are proposed. In these embodiments, the sleeve 12 and/or the bolt 14 is first of all cut using a cutting tool 46 such that a cutting edge 48 of the cutting tool 46 is moved against the sleeve 12 or the bolt 14 in a radial direction toward the centerline 16.

According to the first embodiment, which is illustrated in FIGS. 3A-3C and 4, the sleeve 12 is cut with at least one cut, in the present embodiment with three cuts parallel to the centerline 16 and along the entire region of the retaining grooves. As a result, the sleeve 12 splits open along the cuts, such that the diameter is increased and the internal thread 34 of the sleeve 12 disengages from the retaining grooves 42, formed as an external thread, of the bolt 14.

The cutting of the sleeve 12 according to the first embodiment of the method is illustrated sequentially in FIGS. 3A-3C and takes place with a cutting tool 46 which has a blade 50 with a straight cutting edge 48 which is moved against the sleeve 12, in a manner oriented parallel to the centerline 16, in a radial direction 52 toward the centerline 16, until the sleeve 12 has been cut along the cutting edge 48. The cutting tool 46 also has a supporting body 54 with a contact face 56 for bearing on the second surface 8 of the workpiece arrangement 4, and a bore 58 that proceeds from the contact face 56 and is adapted to the external shape of the sleeve 12, and with a guide slot 60 that extends radially outwardly from the bore 58. The blade 50 is arranged in the guide slot 60 so as to be movably guided such that the cutting edge 48 extends parallel to the central axis 62 of the bore 58 and can be moved into the bore 58 toward the central axis 62.

Two further cutting edges 66 which extend parallel to the central axis 62 and on which the sleeve 12 bears when the latter is located in the bore 58 are provided on the inner wall 59 of the bore 58 in a manner spaced apart uniformly from the guide slot 60 in the circumferential direction, such that, as a result of the pressure exerted on the sleeve 12 by the cutting edge 48 of the blade 50, the sleeve 12 can also be cut by the further cutting edges 66.

To cut the sleeve 12, the cutting tool 46 is arranged such that the contact face 56 bears on the second surface 8 of the workpiece arrangement 4 and the connector 2 projecting out of the hole 10 at the second surface 8 extends through the bore 58 such that the central axis 62 of the bore 58 extends coaxially with the centerline 16 of the bolt 14. Then, the blade 50 is moved in the guide slot 60 toward the sleeve 12 in the direction of the centerline 16 until the cutting edge 48 cuts the sleeve 12, in particular the region of the sleeve 12 with the retaining grooves 42, i.e. with the thread, as can be seen in FIGS. 3A-3C. At the same time, the sleeve 12 is also pressed against the two further cutting edges 66 and cut by the latter on the opposite sides from the blade 50.

As shown in FIG. 4, after the sleeve 12 has been cut, the bolt 14 is removed in the direction of the side of the first surface 6 by the second end 20 of the bolt 14 being struck. This is possible since, as a result of the sleeve 12 being cut, the internal thread 34 of the sleeve 12 is no longer or no longer fully engaged with the external thread, i.e. the retaining grooves 42 of the bolt 14, and so the bolt 14 can be released from the sleeve 12.

According to the second embodiment of the method according to the disclosure herein for removing the connector 2, which is illustrated in FIGS. 5A and 5B, the bolt 14 is cut between the sleeve 12 and the second surface 8 with at least one cut perpendicular to the centerline 16 in the continuation of the second surface 8 of the workpiece arrangement 4. In this way, the detached part of the bolt 14 can be taken out of the hole 10 and removed.

As illustrated in FIGS. 5A and 5B, the bolt 14 is cut with a cutting tool 46 that has two blades 50 with opposite cutting edges 48, which, to cut the bolt 14, are moved toward the bolt 14 from opposite sides, in a manner oriented perpendicularly to the centerline 16, in a radial direction toward the centerline 16, until the bolt 14 has been cut along the cutting edges 48. In the process, the cutting edges 48 are moved between the second surface 8 and the sleeve 12. In this case, the blades 50 have straight cutting edges 48.

The cutting tool 46 has a supporting body 54 in the form of a frame with a contact face 56 for bearing on the second surface 8 of the workpiece arrangement 4, and an opening 70 which, proceeding from the contact face 56, extends perpendicularly along a central axis 62 and into which that part of the connector 2, in particular the sleeve 12, that projects out of the hole 10 at the second surface 8 can extend, and which is adapted to the external shape of the sleeve 12 and of the shank portion 38 of the bolt 14. The two blades 50 with opposite cutting edges 48 are arranged in the opening 70 so as to be movably guided such that the cutting edges 48 extend perpendicularly to the central axis 62 and can be moved toward the central axis 62 from opposite sides in a radial direction.

To cut the bolt 14, the cutting tool 46 is arranged on the workpiece arrangement 72 such that the contact face 56 bears on the second surface 8 and the connector 2 extends through the opening 70 such that the centerline 16 extends coaxially with the central axis 62, after which the blades 50 are moved simultaneously along the second surface 8 toward the bolt 14 from opposite sides and cut the latter between the second surface 8 and the sleeve 12.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for removing a two-part connector in a workpiece arrangement, the method comprising:
    providing a workpiece arrangement comprising:
        a workpiece body comprising a first surface and a second surface, wherein the second surface is opposite the first surface;
        a hole formed through the workpiece body, such that the hole connects the first surface to the second surface; and
        a connector in the hole, the connector having a bolt and a sleeve fastened to the bolt;
        wherein the bolt extends along a centerline between a first end, which is on a side of the first surface of the workpiece arrangement, and a second end, which is on a side of the second surface of the workpiece arrangement;
        wherein the bolt has a head portion, which has a diameter that is greater than a diameter of the hole, and a shank portion, which has a diameter that is less than or equal to the diameter of the hole;
        wherein, relative to the centerline, at least a part of the shank portion projects from the workpiece arrangement on the side of the second surface and has retaining grooves that extend at least predominantly in a circumferential direction of the bolt;
        wherein the sleeve is fastened to the bolt on the side of the second surface such that an inner surface of the sleeve engages with the retaining grooves and prevents relative movement between the connector and the workpiece body in a direction parallel to the centerline; and
        wherein the sleeve has an outside diameter that is greater than the diameter of the hole in the workpiece arrangement;
    cutting the sleeve, using a cutting tool, with a cut parallel to the centerline; and
    removing the connector from the hole;
    wherein the cutting tool comprises:
        a supporting body with a contact face for bearing on the second surface of the workpiece arrangement;
        a bore that proceeds from the contact face into the supporting body;
        a guide slot that is formed in the supporting body and extends radially outwardly from the bore;
        a blade provided within the guide slot, the blade having a straight cutting edge that extends parallel to a central axis of the bore; and
        at least two further cutting edges that extend parallel to the central axis, are formed in an immobile manner on an inner wall of the bore, and are spaced apart from each other and the guide slot in the circumferential direction;
        wherein the guide slot is formed in the supporting body such that the blade is against the second surface of the workpiece arrangement to cut the sleeve;
    wherein cutting the sleeve comprises:
        arranging the cutting tool such that the contact face bears on the second surface of the workpiece arrangement and a portion of the connector that projects out of the hole at the second surface extends into the bore;
        orienting the blade such that the straight cutting edge is parallel to the centerline; and
        moving the blade through the guide slot, into the bore, towards the central axis, and towards and against the sleeve in a radial direction toward the centerline until at least the straight cutting edge of the blade cuts through the sleeve;
    wherein moving the blade through the guide slot, into the bore, towards the central axis, comprises moving the blade parallel to the second surface of the workpiece arrangement; and
    wherein, when the sleeve is located in the bore, the sleeve bears on the at least two further cutting edges while the sleeve is cut.

2. The method of claim 1, wherein the cut extends at least along the retaining grooves.

3. The method of claim 1, wherein the guide slot is formed such that the blade moves parallel to the second surface of the workpiece arrangement while cutting the sleeve.

4. The method of claim 1, comprising, after cutting the sleeve, removing the bolt in a direction toward the side of the first surface.

5. The method of claim 4, wherein removing the bolt comprises striking the second end of the bolt.

6. The method of claim 1, wherein the at least two further cutting edges are uniformly spaced apart from the guide slot in the circumferential direction.

7. The method of claim 6, wherein:
    the at least two further cutting edges is two further cutting edges; and
    cutting the sleeve comprises using the blade and the two further cutting edges to form three cuts in the sleeve due to a pressure exerted by the blade on the sleeve as the blade moves against the sleeve in the radial direction toward the centerline; and
    each of the three cuts is oriented parallel to the centerline.

8. The method of claim 7, wherein each of the three cuts is formed by a corresponding one of the blade and the two further cutting edges.

* * * * *